United States Patent [19]

Kellar et al.

[11] 4,311,503
[45] Jan. 19, 1982

[54] METHOD OF CONTROLLING TEMPERATURE OF GLASS EXITING FURNACES

[75] Inventors: John D. Kellar, Pontypool; Gordon F. Pereman, Columbus, both of Canada

[73] Assignee: PPG Industries, Inc., Pittsburgh, Pa.

[21] Appl. No.: 204,762

[22] Filed: Nov. 10, 1980

[51] Int. Cl.³ .................. C03B 25/08; C03B 27/00
[52] U.S. Cl. ........................ 65/29; 65/118; 65/162; 65/163
[58] Field of Search ............... 65/29, 118, 119, 162, 65/163

[56] References Cited

U.S. PATENT DOCUMENTS

| | | | |
|---|---|---|---|
| 2,079,566 | 4/1937 | Wadman | 236/15 |
| 3,257,188 | 6/1966 | Morgan et al. | 65/29 X |
| 3,479,172 | 11/1969 | McCown et al. | 65/29 X |
| 3,744,985 | 7/1973 | Peternel | 65/104 |
| 3,880,635 | 4/1975 | Jack et al. | 65/106 |
| 4,071,344 | 1/1978 | Blausey | 65/29 |

FOREIGN PATENT DOCUMENTS

| | | | |
|---|---|---|---|
| 870828 | 5/1971 | Canada | 341/31 |
| 1031960 | 5/1978 | Canada | 49/45 |

Primary Examiner—Arthur D. Kellogg
Attorney, Agent, or Firm—Edward I. Mates

[57] ABSTRACT

Controlling the exit temperature of heated glass sheets of different thicknesses within a predetermined thickness range and/or different heat absorbing characteristics e.g. color, so that each sheet arrives at the furnace exit at substantially the same elevated temperature required for subsequent treatment that is substantially equal from sheet to sheet.

11 Claims, 3 Drawing Figures

U.S. Patent  Jan. 19, 1982  4,311,503
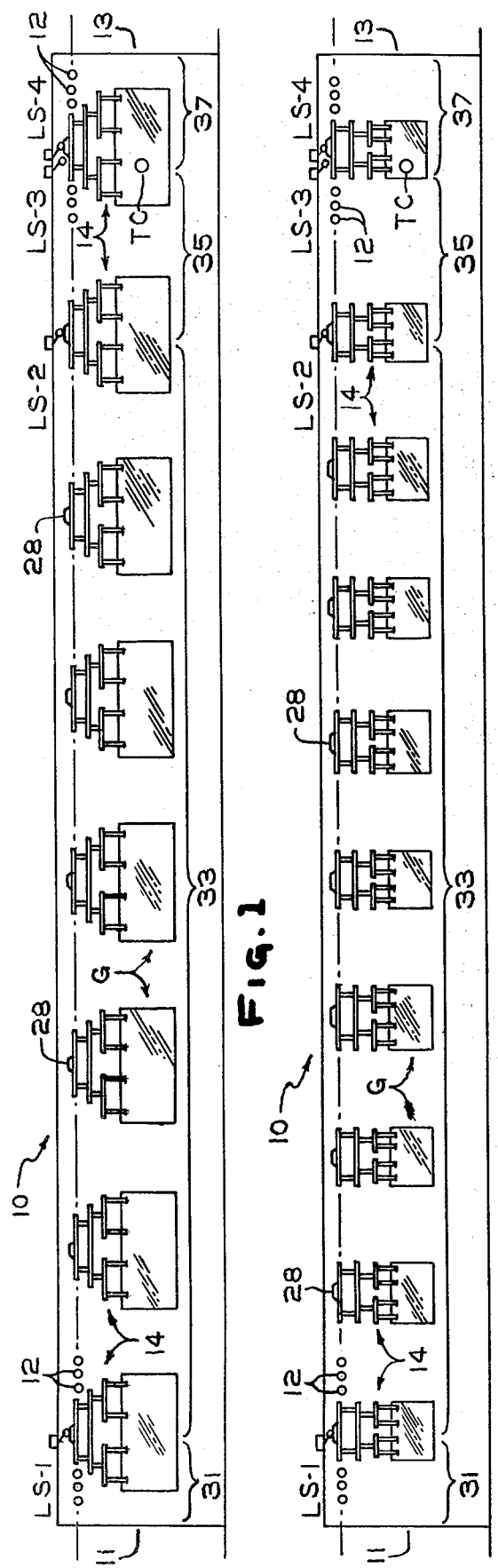
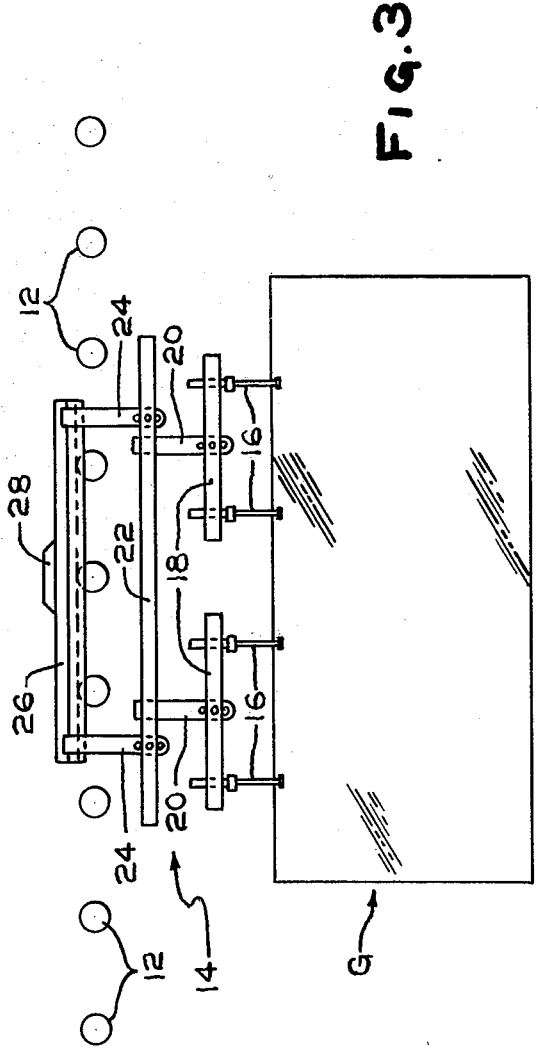

METHOD OF CONTROLLING TEMPERATURE OF GLASS EXITING FURNACES

BACKGROUND OF THE INVENTION

1. Field of the Invention

The present invention relates to the thermal treatment of glass sheets, particularly those that have to be heated to a precise elevated temperature requisite for further processing. Further processing might involve tempering and annealing or other heat strengthening depending upon the rate of cooling subsequent to the heating of the sheet to the elevated temperature requisite for the following treatment. Glass sheets are also heated to elevated temperatures prior to the application of a coating composition that develops into a coating on contact with the heated surface of the glass sheet. In any event, uniformity of product depends upon the uniformity of temperature of each sheet in a series of glass sheets that is processed.

While the present invention will be described in terms of a method and an apparatus for press bending and tempering glass sheets for the development of glazing closures for vehicles such as automobiles, it is understood that the present invention is also suitable for use in obtaining uniform temperature from sheet to sheet regardless of the nature of the subsequent glass sheet treatment. Where a succession of glass sheets must be treated at elevated temperature with a composition that reacts at the surface of the glass to provide a coating having desired optical or color characteristics, the uniformity of the coating from sheet to sheet is important for commercial purposes. Unless each sheet has the same characteristics as every other sheet in a series of sheets produced for a particular customer, the uniformity of appearance of the sheets in a building will be spoiled and the fabrication technique that does not provide uniformity of product from sheet to sheet leaves something to be desired.

It is well known that when glass sheets of different thicknesses are conveyed through an enclosed heating furnace at a uniform cycle of speed through the furnace from sheet to sheet, that those sheets that are relatively thin will develop a higher temperature on reaching the furnace exit whereas relatively thicker sheets will develop a lower temperature on arrival at the furnace exit. Consequently, glass sheets of different thicknesses will be shaped to different configurations, because those sheets that are relatively cold will be more difficult to bend into shape whereas the relatively thin sheets will retain a higher temperature after they are shaped and tend to lose the imparted shape until their temperature is reduced to one below which the sheet continues to deform. If the heated sheets are to be treated with a coating composition, it is evident that the different temperatures at which the composition is applied to sheets of different thicknesses will cause differences in characteristics of the resulting films.

2. Description of Patents of Interest

U.S. Pat. No. 3,744,985 to Peternel discloses a method and apparatus for controlling the furnace temperature in response to the average temperature of different regions of certain recently heated glass sheets as each heated glass sheet leaves the furnace en route to a further treatment station. The temperature control within the furnace is adjusted in the light of the recent history of glass sheet temperatures. Therefore, if glass sheets of random thicknesses are conveyed through the furnace, there is no assurance that a temperature control based on the average temperature of recently processed glass sheets would provide a suitable correction to improve the furnace temperature used to heat subsequent glass sheets.

U.S. Pat. No. 4,071,344 to Blausey discloses a glass sheet heating furnace provided with a conveyer which is automatically adjusted in response to temperature variations from a desired level detected in heated sheets as the latter leave the heating furnace en route to a further treatment station. The modification of conveyor speed is for the purpose of varying the heat exposure time of the subsequent sheets in the furnace. Any adjustment in furnace speed will affect the temperature of all the subsequent glass sheets that are conveyed through the furnace. Neither of the previous glass sheet treating furnaces are capable of applying more or less heat to individual sheets in accordance wth their respective measured temperatures. Therefore, thickness variations in any individual glass sheet passing through the furnace may tend to cause the furnace controls to surge in an oscillating manner around the desired temperature for any subsequent glass sheet.

Canadian Pat. No. 870,828 to Matsuno and Morisue relates to the operation of a multiple zone furnace for heating steel prior to a rolling operation. The furnace includes preheating, heating and soaking zones with the amount of heat in each zone being controlled. This patent recognizes problems arising from non-uniform heating of steel materials arising from various factors of non-uniformity such as varying dimensions or thicknesses of the steel material. This patented apparatus deals with steels and it is difficult to determine the temperature of the steel at different critical locations within the furnace. The temperatures are determined by indirect methods involving certain direct measurements coupled with the use of mathematical formulas. There is some suggestion of varying the velocity of a moving object in a heating zone to achieve the desired final temperature. However, the problems involved in heating steel which does not require any optical properties are much less critical than those involved in heating glass sheets to produce transparent articles having critical optical properties.

U.S. Pat. No. 3,880,635 to Jack and Richards and Canadian Pat. No. 1,031,960 to Jack, Richards, Hayward and Challis disclose thermal treatment within an enclosed furnace that supports glass sheets on its lower edge in a near vertical orientation with an edge supported on rollers inclined slightly from the vertical. The heating pattern throughout the length of the furnace is controlled in such a manner as to have the glass sheets processed through the furnace in preparation for additional treatment to develop a so-called deformation index within critical limits. These patents fail to provide means to control the temperature attained by any individual glass sheet being processed. They control the overall temperature pattern of the furnace.

SUMMARY OF THE INVENTION

In describing the present invention, the terms "developed temperature" and "target temperature" are used. For this specification, the term "developed temperature" is the temperature of a glass sheet determined on its arrival at a check station and the term "target temperature" is a temperature higher than the developed temperature that is desired for the glass sheet when it leaves the check station.

The present invention relates to a multiple speed treatment of glass sheets wherein each individual glass sheet is conveyed through the main portion of an enclosed heating furnace to arrive at a check station at a developed temperature within a range of desired developed temperatures. This developed temperature is sensed for each glass sheet as the glass sheet arrives at the check station. The latter is located within a soaking area delivering radiation at a higher heat intensity than the acceptable range of developed temperatures. The sheet is conveyed at one speed to a transfer point, then transferred at high speed to the check station, and maintained at the soaking area for a minimum time needed to heat the sheet from its developed temperature to a target temperature. However, should the next sheet in the series arrive at the transfer point for transfer at high speed to the check station before the first sheet attains the target temperature, the first sheet is rapidly removed from the soaking area as the next sheet moves from the transfer point to the check station.

If the developed temperature is determined to be outside the preferred range of developed temperatures, the heating pattern within the main portion of the furnace and/or the conveyor speed of glass sheets moving from the entrance of the furnace to the check station are correlated and modified in such a manner that each glass sheet of the series is heated to a developed temperature within a preferred range of developed temperatures and the heat intensity at the soaking area is so arranged that the time available for additional heating at the soaking area of any glass sheet in the series from its developed temperature to the target temperature in such that glass sheets having a thickness within a given range of thicknesses can be heated from their developed temperature to the target temperature within the soaking area before the next glass sheet arrives at the transfer point for rapid transfer to check station. However, should a glass sheet arrive at the check station at a developed temperature which equals or exceeds the target temperature, the arriving glass sheet moves continuously through the soaking area.

The purpose of the present invention is to have each glass sheet in turn spend a limited amount of time in the soaking area unique for each individual sheet to further heat each glass sheet in turn from its developed temperature it attains on arrival at the check station to the target temperature. It is only when glass sheets of different thicknesses arrive at the check station outside the desired range of developed temperatures that it becomes necessary to alter either the conveyor speed through the main portion of the furnace that terminates at the check station or to adjust the heat input into the main portion of the furnace.

In a specific embodiment of the present invention, the glass sheets arrive at the check station at developed temperatures that are below the target temperature by less than 30° C. so that the time that the glass sheet remain in a stationary position at the soaking area can be anywhere from 0 to 15 seconds. The temperature of the heating elements at the soaking area is so adjusted as to increase the glass temperature from the developed temperature to the target temperature at a rate of approximately 2° C. per second. The speed of movement of glass sheets through the furnace is so controlled that the individual sheets arrive at the check station in uniform time intervals, usually 10 to 15 seconds apart. For glass sheets arriving every 10 seconds, the developed temperature can range from 0° to 20° C. less than the target temperature without disrupting operation and allowing each glass sheet in the series to leave the soaking area at exactly the target temperature. When a carriage supporting one or more glass sheets arrives at the check station every 15 seconds, then it is possible for the developed temperature to be between 0° and 30° C. below the target temperature, thereby allowing 15 seconds for each glass sheet to increase its temperature from its developed temperature to the target temperature.

A target temperature is determined that is closely related to the glass temperature at the nearby exit or the glass temperature on arrival at a treatment station because the check station is adjacent to the exit or the next treatment station. A high speed run-out from the check station minimizes the time for glass sheet cooling after it leaves the check station.

The main benefit of the present invention is that regardless of the exact temperature developed by each glass when it arrives at the check station, the temperature of each glass sheet upon leaving the furnace exit or upon arriving at the next treatment station can be very precisely controlled. Also, the heaters in the soaking area may be arranged to provide a temperature gradient opposite that of the main furnace portion. In such a case, a longitudinal temperature gradient along the length of the sheet tends to normalize. These and other benefits of the present invention will be understood in the light of a description of specific embodiments thereof which follows.

BRIEF DESCRIPTION OF THE DRAWINGS

In the drawings that form a part of the description of preferred embodiments of this invention and wherein like reference numbers are applied to like structural elements, FIG. 1 is a longitudinal schematic view of a furnace that has been modified according to the teachings of the present invention for use in handling glass sheets of a relatively large size;

FIG. 2 is a view similar to FIG. 1 of an alternate embodiment, showing how the furnace of FIG. 1 may be modified to handle a larger number of smaller glass sheets during the thermal treatment of the glass sheets according to the present invention; and FIG. 3 is a longitudinal elevation of a glass sheet supporting carriage showing certain details of carriage structure.

DESCRIPTION OF THE PREFERRED EMBODIMENTS

The specific embodiment of the present invention comprises a tunnel-type furnace 10 having a closable entrance door 11 at its upstream end, comprising a plurality of overhead conveyor rolls 12 arranged in sections that are driven through clutches at predetermined controllable speeds, or that may be stopped completely depending upon the cycle to be described later. An exit door 13 is at the downstream end of furnace 10. Along the length of the conveyor, a plurality of tong support carriages 14 are arranged in substantially equally spaced relation. Each carriage 14 supports a plurality of self-closing tongs 16. A preferred form of self-closing tong is depicted in U.S. Pat. No. 3,089,727 to Hay.

In each carriage 14, two or more tongs 16 are suspended from a tong suspension bar 18. Two tong suspension bars are shown in the apparatus depicted in FIG. 3. However, the number of tong suspension bars and the number of tongs suspended from each bar may be more or less, depending upon the complication of shape to which the glass sheet suspended from the tongs is to be shaped. A typical more complicated tong suspension arrangement which may be used with the present invention is shown in U.S. Pat. No. 4,104,047 to Seymour.

Each of the tong suspension bars is rigidly supported at the lower end of a vertical shaft 20. Two vertical shafts 20 are shown connected to and suspended from a lower horizontal carriage bar 22. The latter, in turn, is connected through a series of vertical carriage shafts 24 which are curved in their vertical dimension and connected at their lower ends to the lower horizontal carriage bar 22 and at their upper ends to an upper horizontal carriage bar 26. The latter supports, at the geometric center of its upper surface, a cam 28 positioned to actuate a plurality of limit switches located along the length of the conveyor.

The arrangement of the limit switches and their operations to provide the novel result of the present invention will first be described generally. Then, two specific arrangements for handling a different number of carriages for conveying sheets of different length in the furnace will be described to explain in detail how specific embodiments of the present invention operate in order to provide a better understanding of the present invention.

Limit switch LS-1 is located near the entrance door 11 to the furnace 10. Since entrance and exit doors of heating furnaces are of conventional structure, they are not shown in the drawings even though their locations are specified by reference numbers.

The position of each of the limit switches can be adjusted longitudinally of the conveyor, if desired, depending upon the length of glass sheet to be handled. However, in a specific embodiment of the present invention, a limit switch LS-1 is located a fixed distance from the entrance door 11, specifically 38 inches (96.52 cm). This is sufficient distance for handling the longest of the glass sheets presently used in automobiles and represents more than half the length of the longest glass sheet for which the apparatus is designed to handle. A second limit switch LS-2 is located 560 inches (1422.4 cm) downstream of limit switch LS-1. A third limit switch LS-3 is located 70 inches (117.8 cm) downstream of limit switch LS-2. Approximately 6 inches (15.24 cm) downstream of limit switch LS-3 is a fourth limit switch LS-4.

Limit switches LS-3 and LS-4 are located in a soaking area toward the exit door 13 of the furnace. Limit switch LS-3 is in position to be activated by cam 28 to center carriage 14 relative to limit switch LS-3 while the glass sheet supported thereby is wholly within the soaking area. The positions of the limit switches recited suffices for handling glass sheets 65 inches (165.1 cm) long on 7 tong supporting carriages (shown in FIG. 1 to be equally spaced between limit switches LS-1 and LS-2). An eighth tong supporting carriage is shown leaving the soaking area as the following carriage arrives at the end of the main portion of the furnace under circumstances to be described later in greater detail.

The furnace also includes a non-contacting temperature sensing element TC that is trained on an area occupied by a glass sheet in the soaking station. This area is aligned vertically with the position occupied by limit switch LS-3.

The conveyor 10 comprises a high speed run-in section 31, which extends from upstream of the entrance door 11 to approximately the location of the limit switch LS-1. Next follows a main conveyor section 33 extending from adjacent limit switch LS-1 to adjacent limit switch LS-2. This conveyor section is set to run at a normal conveyor speed. Next, a high speed transfer conveyor section 33 extends from adjacent limit switch LS-2 to adjacent limit switch LS-3. Finally, a high speed run-out conveyor section 37 extends from limit switch LS-3 to beyond the exit door 13. The main portion of the furnace 10 is approximately coextensive with main conveyor section 33.

The functions of the various limit switches are set forth in the table as follows:

TABLE 1

| Limit Switch | FUNCTIONS OF LIMIT SWITCHES Function (s) |
|---|---|
| LS-1 | 1 - closes furnace entrance door 11<br>2 - stops run-in conveyor section 31 when carraige reaches main conveyor section 33<br>3 - actuates counting device that times out to open furnace entrance door and actuate run-in conveyor section at high speed |
| LS-2 | 1 - actuates high speed transfer conveyor section 35 to transfer carriage cam 28 from LS-2 to LS-3 |
| LS-3 | 1 - stops high speed transfer conveyor section 35 with carriage cam 28 at LS-3<br>2 - energizes sensing element TC which actuates high speed transfer conveyor section 35 when TC detects glass sheet has attained target temperature, if glass sheet attains target temperature before said predetermined time delay expires |
| LS-4 | 1 - opens furnace exit door 13<br>2 - actuates timer circuit that times out to close furnace exit door 13 after predetermined time delay sufficient for carriage 14 and glass sheet to clear furnace |

In a typical operation, a series of carriages 14 are loaded one at a time at a loading station immediately upstream of the entrance door 11 to the furnace 10. Each carriage, in turn, is actuated to run on conveyor rolls 12 into the furnace on high speed run-in conveyor section 31 to a position at which its cam 28 engages limit switch LS-1 to stop rotating the rolls 12 in the high speed run-in conveyor section 31. At this time, the leading end of its upper horizontal carriage bar 26 rests on the rolls 12 of the main conveyor section 33, which rotate at a normal conveyor speed less than the speed of run-in conveyor section 31. The rolls 12 of the main conveyor section 33 move the carriage from the position where the cam 28 engages limit switch LS-1 to a position where the cam engages limit switch LS-3 in 135 seconds. This can be accomplished either by moving the carriages at a constant rate of speed or in stages from limit switch LS-1 to limit switch LS-2 and then at higher speed to limit switch LS-3 so that each carriage moves through different positions throughout the main portion of the furnace, finally occupying a position in which the carriage cam 28 engages limit switch LS-3.

When the carriage cam energizes limit switch LS-1, a counting device is actuated that stops the run-in conveyor section after the upper horizontal carriage rail is sufficiently engaged by the conveyor rolls of the main conveyor section 33 operating at the normal conveyor speed of which the parameters to be mentioned are exemplary. The counting device also opens the furnace entrance door 11 and actuates the run-in conveyor section 31 at high speed. It is incumbent upon an operator loading the next carriage 14 with glass sheets in gripping relation by the self-closing tongs 16 to make sure that the next carriage is loaded in sufficient time for the automatic timed operation of the run-in conveyor section 31 to take place with a carriage 14 loaded with glass.

When the glass sheet supporting carriage arrives at a transfer position where its cam 28 engages limit switch LS-2, it actuates the limit switch LS-2 to actuate the high speed transfer conveyor section 35 to transfer the carriage from the transfer position where its cam engages limit switch LS-2 to a position of engagement with limit switch LS-3 in five seconds. The carriage 14 comes to rest with its cam 28 engaging limit switch LS-3 for a time dependent upon the developed temperature that is measured by sensing element TC when cam 28 engages limit switch LS-3.

If the developed temperature equals or exceeds the target temperature for the glass sheet, the sensing element TC closes a parallel switch (not shown) immediately to actuate the high speed run-out conveyor section 37 and to continue moving the carriage through the soaking area. As the cam passes limit switch LS-4, it actuates the latter. Limit switch LS-4 opens the furnace exit door 13 and permits the glass sheet to be removed from the furnace at a minimum temperature above the target temperature possible in view of the too high developed temperature that the glass sheet has attained on arrival at the check station where its temperature is determined through sensing element TC.

If the developed temperature, as determined by sensing element TC, is less than the target temperature, limit switch LS-3 stops the high speed transfer conveyor section 35 with the carriage cam 28 engaging limit switch LS-3. If a carriage cam 28 of a carriage 14 is in contact with limit switch LS-3 when the carriage cam 28 of an upstream carriage 14 contacts limit switch LS-2, the high speed transfer conveyor section 35 is activated as previously discussed and the high speed run-out conveyor section 37 is energized to move the carriage having its cam engaging the limit switch LS-3 to provide room at position of limit switch LS-3 for the carriage moving downstream from position of limit switch LS-2. However, if the previous sheet attains the target temperature before the subsequent carriages arrives at the transfer position where its cam 28 engages limit switch LS-2, the sensing element TC closes the parallel switch to reactivate the high speed run-out conveyor section 37 at high speed to remove the carriage containing the glass at the target temperature. In this case, the carriage cam 28 actuates limit switch LS-4 to open the furnace exit door and actuates the timer circuit that times out to close the furnace exit door 13 after a predetermined time delay sufficient for the carriage and the glass sheet to clear the furnace as in the previous case.

The heating elements throughout the length of the furnace are constructed and arranged to have the glass sheets arrive at a position facing the check station at a predetermined temperature which is between 0° and 30° C. below the target temperature desired for the glass sheet when it leaves the check station within the soaking station of the furnace. The exact predetermined target temperature depends upon the thickness of glass sheets, and whether the glass sheets are to be tempered while flat or whether they are to be shaped by press bending prior to their tempering after they leave the furnace exit. However, the relation of the target temperature to the temperature of further operation is important. Hence, it is important to locate the check station near the furnace exit door 13.

For an operation that delivers 180 tempered glass sheets per hour as depicted in the arrangements shown in FIG. 1 wherein the counters are arranged to have a carriage engage limit switch LS-1 and another carriage engaging limit switch LS-2 every 20 seconds, a maximum of 15 seconds is available to heat the sheet in the soaking station of the furnace from the developed temperature to the target temperature. When the heating elements are arranged to heat the glass sheet at a rate of 2° C. per second in the soaking station, the developed temperature sensed at the check station must not be cooler than 30° C. below the target temperature, whatever that might be.

In an alternate operation for treating shorter sheets, for example those only 32 inches (81.28 cm) long separated by 38 inches (96.52 cm), which produces 240 sheets per hour, which is illustrated in FIG. 2, a sheet arrives at the check station every fifteen seconds. Since five seconds is needed to transfer the sheet from the transfer position where its carriage cam 28 engages limit switch LS-2 to a position where its carriage cam engages limit switch LS-3, only 10 seconds are available for soaking time. This means that the developed temperature of glass sheets must be no more than 20° C. cooler than the target temperature in order to produce 240 sheets per hour. However, the uniformity of temperature from sheet to sheet can be obtained by individual treatment of each glass sheet in turn and the thermal treatment of any individual glass sheet does not modify the thermal treatment of the glass sheets that follow the particular glass sheet being treated. In both the FIG. 1 and FIG. 2 embodiments, each carriage takes 130 seconds to travel from where its cam engages limit switch LS-1 to the transfer position where carriage cam 28 engages limit switch LS-2 and 5 more seconds to move the carriage to the soaking station where its cam 28 engages limit switch LS-3.

If, during a production operation, it is determined that a plurality of sheets move through the position occupied by limit switch LS-3 without stopping, the operator will realize that the temperature developed by the glass sheets on arrival at the check station is too high and either the main conveyor section 33 can be speeded up to assure a lower developed temperature for the glass sheets or the heating pattern within the furnace can be made less intense so as to assure that the developed temperature is sufficiently below the target temperature to assure that some soaking time not exceeding the time interval between carriages is available to further heat each glass from its developed temperature to its target temperature before removing the sheet from the soaking area.

Furthermore, when the glass sheets arrive at the check station at a temperature that is below the preferred range of developed temperatures (i.e., a temperature colder than the temperature differential permitted below the target temperature) so that the carriage, supporting a soaking sheet, is forced to leave the vicinity of limit switch LS-3 when the next carriage actuates limit switch LS-2, an operator should be alerted to the fact that the main portion of the furnace requires adjustment either by reducing the noraml conveyor speed or by increasing the intensity of heat irradiated by the furnace heaters.

The two examples described previously are based on heating sheets in the soaking area to increase their temperature at a rate of 2° C. per second. However, a more general formula has been developed to determine the approximate residence time (t) in seconds needed for a glass sheet to occupy a soaking position in the soaking area to be heated from its developed temperature (DT) attained on arrival at its soaking position to a target temperature (TT) while the carriage cam 28 engages limit switch LS-3 for a heating rate of a d degrees per second in the soaking station. This formula is t=(TT−DT)/d.

The target temperature is usually in the range of 630° C. to 655° C. The exact target temperature selected deponds on the glass composition, its thickness, the complexity of the bend to which it is to be shaped and whether it is to be shaped, and the distance from the check station to a subsequent treatment station.

While the embodiments described relate to a heating furnace having a main conveyor section 33 extending approximately from limit switch LS-1 to limit switch LS-2 that operates continuously at a normal conveyor speed, it is equally suitable to use the present invention in an enviornment in which the main conveyor section 33 operates in stages.

If the conveyor moves the carriages through the enclosed heating furnace 10 at a uniform speed, the leading end portion of the glass sheet tends to develop a higher temperature than the trailing end portion. Having each glass sheet remain for some time in the soaking area at the downstream end of the furnace tends to normalize the longitudinal thermal gradient in the sheet. Further normalization of the temperature pattern along the length of the sheet when the latter occupies its soaking position may be obtained by controlling the longitudinal temperature gradient of the heating elements in the soaking area in such a manner that the upstream heating elements of the soaking area facing the trailing end portion of the glass sheet are energized to be relatively hot and the downstream heaters in the soaking area that face the leading end portion of the glass sheet during soaking are energized to be relatively cold compared to the temperature of the heaters facing the portion at the longitudinal geometric center of the glass sheet. The temperature difference between the upstream heaters and the downstream heaters may vary over a wide range depending on the average longitudinal thermal gradient imposed on the glass sheets on their arrival at the check station. Usually a temperature difference in the range of from 5° C. to 50° C. is suitable relative to the temperature at the geometric center of the soaking station.

Of course, unwanted vertical temperature gradients developed in the glass sheets are compensated by having a vertical gradient of heating element temperatures wherever convenient in the furnace including the soaking area such that the heating elements that face the upper portion of the glass sheets are approximately 25° C. cooler than those facing their central portion and those facing their lower portion are approximately 25° C. hotter than those facing their central portion.

The form of the invention shown and described in this disclosure represents an illustrative preferred embodiment and modification thereof. It is understood that various changes may be made in speeds and in temperatures depending upon the nature of the thermal treatment desired without departing from the gist of the invention as defined in the claimed subject matter which follows.

We claim:

1. A method of heating each of a series of glass sheets having thicknesses varying over a thickness range to a substantially uniform furnace exit temperature comprising conveying each glass sheet in turn at a timed interval through an enclosed heating furnace to a check station in a soaking area near the exit of said furnace while undergoing exposure to a predetermined amount of radiation per unit area when it arrives at said check station, whereby a sheet of less thickness obtains a higher developed temperature and a sheet of greater thickness obtains a lesser developed temperature on its arrival at said check station, exposing said sheet at said check station to heating means delivering radiation at a higher heat intensity than said developed temperature to soak said sheet, maintaining said sheet at said check station for a unique soaking time for said sheet depending on the developed temperature of said sheet, said soaking time ranging from the minimum soaking time needed to heat the sheet from its developed temperature to a target temperature to a maximum soaking time that does not exceed said timed interval, and rapidly removing said sheet from said enclosed furnace either when it attains said target temperature or when said timed interval expires before said sheet attains said target temperature.

2. A method as in claim 1, including maintaining the heating pattern of said heating furnace and time of exposure of said sheet wwithin said heating furnace en route to said check station in such a manner that each glass sheet of said series, on arrival at said check station, obtains a developed temperature within a preferred range of developed temperatures that is within a limited range of temperatures below said target temperature so that the time available for soaking any glass sheet in said series from its said developed temperature to said target temperature while said glass sheet is soaking at said check station iń such that glass sheets having a thickness within said range of thicknesses can be heated to said target temperature by soaking before said timed interval expires.

3. A method as in claim 2, further including measuring the developed temperature of said sheet at said check station, and, if a developed temperature measured is outside said preferred range of developed temperatures, adjusting the heating pattern of said enclosed heating furnace in such a direction as to obtain developed temperatures for subsequent sheets in said series within said preferred range of developed temperatures.

4. A method as in claim 3, wherein should said developed temperature measurement signify that said glass sheet obtains a developed temperature on arrival at said check station that is at least equal to said target temperature, removing said glass sheet from said check station without stopping.

5. A method as in claim 3, wherein should said developed temperature measurement signify that a plurality of successive of said glass sheets obtains a developed temperature that is at least equal to said target temperature, reducing the intensity of the heating pattern of said enclosed heating furnace sufficiently for subsequent sheets to arrive at said check station at a developed temperature within said preferred range of developed temperatures.

6. A method as in claim 2, wherein should said developed temperature measurement signify that a plurality of successive of said glass sheets obtains a developed temperature that is below said preferred range of developed temperatures, increasing the intensity of the heating pattern of said enclosed heating furnace sufficiently for subsequent sheets to arrive at said check station at a developed temperature within said preferred range of developed temperatures.

7. A method as in claim 2, further including measuring the developed temperature of said sheet at said check station, and, if a developed temperature measured is outside said preferred range of developed temperatures, adjusting said time of exposure for subsequent sheets of said series in such a direction as to obtain developed temperatures for said subsequent sheets within said preferred range of developed temperatures.

8. A method as in claim 7, wherein should said developed temperature measurement signify that a plurality of successive of said glass sheets obtains a developed temperature that is at least equal to said target temperature, reducing said time of exposure sufficiently for subsequent sheets to arrive at said check station at a developed temperature within said preferred range of developed temperatures by moving said subsequent sheets to said check station more rapidly than said sheet.

9. A method as in claim 7, wherein should said developed temperature measurement signify that a plurality of successive of said glass sheets obtains a developed temperature that is below said preferred range of developed temperatures, increasing said time of exposure sufficiently for subsequent sheets to arrive at said check station at a developed temperature within said preferred range of developed temperatures by moving said subsequent sheets to said check station less rapidly than said sheet.

10. A method as in claim 1, wherein the radiant energy during said soaking step is adjusted to heat said glass sheet at a rate of d degrees per second from said developed temperature (DT) to said target temperature (TT) and the time (t) in seconds that the glass sheet spends at said check station is approximately $t = (TT - DT)/d$.

11. A method as in claim 1, wherein the glass sheet is subjected to radiation providing a temperature gradient that ranges from a lesser temperature facing its leading edge and a greater temperature facing its trailing edge when the sheet is soaked at said check station.

* * * * *